US012283441B2

(12) United States Patent
Lin et al.

(10) Patent No.: US 12,283,441 B2
(45) Date of Patent: Apr. 22, 2025

(54) KEY STRUCTURE

(71) Applicant: Lite-On Technology Corporation, Taipei (TW)

(72) Inventors: Yu-Ming Lin, Taipei (TW); Chih Lung Luo, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/972,529

(22) Filed: Oct. 24, 2022

(65) Prior Publication Data

US 2023/0129207 A1 Apr. 27, 2023

Related U.S. Application Data

(60) Provisional application No. 63/271,231, filed on Oct. 25, 2021.

(51) Int. Cl.

*H01H 3/12* (2006.01)
*H01H 13/7073* (2006.01)
*H01H 13/83* (2006.01)

(52) U.S. Cl.

CPC ........ *H01H 13/7073* (2013.01); *H01H 3/125* (2013.01); *H01H 13/83* (2013.01)

(58) Field of Classification Search

CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS

| | | | | |
|---|---|---|---|---|
| 6,706,985 | B2 * | 3/2004 | Chun | H01H 13/38 200/344 |
| 10,373,777 | B1 * | 8/2019 | Lin | H01H 3/125 |
| 2013/0334022 | A1 * | 12/2013 | Shen | H01H 3/125 200/344 |
| 2019/0164702 | A1 * | 5/2019 | Uang | H01H 13/705 |
| 2020/0294733 | A1 * | 9/2020 | Ruff | H01H 13/7006 |

* cited by examiner

*Primary Examiner* — Ahmed M Saeed
(74) *Attorney, Agent, or Firm* — JCIPRNET

(57) ABSTRACT

A key structure including a bottom plate, a switch element, a keycap, a positioning element, and a linkage rod is provided. The switch element is disposed on the bottom plate. The keycap is disposed on the switch element, and the switch element is located between the bottom plate and the keycap. The positioning element is connected to the bottom plate and located between the bottom plate and the keycap. The linkage rod is disposed between the keycap and the positioning element. The linkage rod has a portion disposed at a position corresponding to a groove, and two opposite sides of the linkage rod are each in contact with the keycap and the positioning element.

18 Claims, 6 Drawing Sheets

KEY STRUCTURE

CROSS-REFERENCE TO RELATED APPLICATION

This application claims the priority benefit of U.S. provisional application Ser. No. 63/271,231, filed on Oct. 25, 2021. The entirety of the above-mentioned patent application is hereby incorporated by reference herein and made a part of this specification.

BACKGROUND

Technical Field

The disclosure relates to a key structure, and particularly to a key structure applied to a keyboard.

Description of Related Art

Keyboards, common physical input devices, are used to assist a user in operating or inputting signals to a personal desktop computer, a laptop computer, a tablet computer, or other electronic devices equipped with a keyboard or an external keyboard. Specifically, the keyboard is composed of multiple key structures, which can be divided into short keys and long keys according to the length of a keycap. Generally, a linkage rod (or balance rod) is disposed under the keycap of a long key. When any position of the keycap is pressed, the linkage rod can drive the keycap to sink smoothly, preventing the keycap from tilting or shaking. However, due to the development trend of thinner products, the space under the keycap of the long key is continuously reduced, resulting in the inability to properly configure the linkage rod (or balance rod), which not only fails to meet the development trend of thinner products but also affects the operation reliability of long keys.

SUMMARY

The disclosure aims at a key structure, which not only conforms to the development trend of thinner products but also contributes to improving the operation reliability.

According to an embodiment of the disclosure, a key structure includes a bottom plate, a switch element, a keycap, a positioning element, and a linkage rod. The bottom plate has a first surface, a second surface opposite to the first surface, and a groove extending from the first surface to the second surface. The switch element is disposed on the first surface. The keycap is disposed on the switch element. The switch element is located between the bottom plate and the keycap. The positioning element is connected to the second surface. The linkage rod is disposed between the keycap and the positioning element. The linkage rod has a portion disposed at a position corresponding to the groove, and two opposite sides of the linkage rod are each in contact with the keycap and the positioning element.

According to an embodiment of the disclosure, in the key structure, the switch element includes a base, two brackets, and an elastic restoring body. The base is fixed on the bottom plate. The two brackets are in contact with the keycap. The two brackets are movably connected to the base; and two opposite ends of the elastic restoring body are each connected to the two brackets.

According to an embodiment of the disclosure, in the key structure, the bracket has a first engaging portion, a second engaging portion opposite to the first engaging portion, and a third engaging portion between the first engaging portion and the second engaging portion. The first engaging portion of the bracket is movably engaged with the keycap, the third engaging portion of the bracket is movably engaged with the base, and the two second engaging portions of the two brackets are movably engaged with each other.

According to an embodiment of the disclosure, in the key structure, the switch element further includes a trigger body and a trigger contact, the trigger body is disposed between the two brackets and the base, and the trigger contact is disposed on the bottom plate corresponding to the trigger body.

According to an embodiment of the disclosure, in the key structure, the elastic restoring body is a spring, and two ends of the spring are each connected to upper parts of the two brackets.

According to an embodiment of the disclosure, the key structure further includes a reciprocating element disposed on the first surface. The reciprocating element is located between the keycap and the bottom plate and on one side of the switch element.

According to an embodiment of the disclosure, in the key structure, the positioning element has a positioning groove, and one end of the linkage rod is slidably disposed in the positioning groove.

According to an embodiment of the disclosure, in the key structure, the linkage rod includes a first rod portion in contact with the keycap and a second rod portion in contact with the positioning element, and the groove is located on a lifting path of the first rod portion.

According to an embodiment of the disclosure, the key structure further includes a light-emitting element disposed on the first surface of the bottom plate. The light-emitting element is disposed in a projection area of the keycap projected onto the bottom plate.

According to an embodiment of the disclosure, in the key structure, the switch element includes an elastic restoring body, a trigger contact covered by the elastic restoring body, and two brackets located at a position corresponding to a periphery of the elastic restoring body. Two opposite ends of the elastic restoring body are each in contact with the keycap and the bottom plate, one end of the bracket is in contact with the keycap, and the other end of the bracket is in contact with the bottom plate.

According to an embodiment of the disclosure, the two brackets are pivotally connected to each other.

According to another embodiment of the disclosure, a key structure includes a bottom plate, a switch element, a keycap, a positioning element, a linkage rod, and a light-emitting element. The switch element is disposed on the bottom plate. The keycap is disposed on the switch element. The switch element is located between the bottom plate and the keycap. The positioning element is connected to the bottom plate and located between the bottom plate and the keycap. The linkage rod is disposed between the bottom plate and the keycap. Two opposite sides of the linkage rod are each in contact with the keycap and the positioning element. The light-emitting element disposed on the bottom plate is located on one side of the switch element or in a projection area of the switch element projected onto the bottom plate.

According to another embodiment of the disclosure, in the key structure, each of the brackets has a first engaging portion, a second engaging portion opposite to the first engaging portion, and a third engaging portion between the first engaging portion and the second engaging portion. The first engaging portion of the bracket is movably engaged with the keycap, the third engaging portion of the bracket is movably engaged with the base, and the two second engaging portions of the two brackets are movably engaged with each other.

According to another embodiment of the disclosure, in the key structure, the positioning element extends toward the keycap and is located outside the base.

According to another embodiment of the disclosure, the bottom plate includes a metal support plate and a circuit layer, and the light-emitting element is electrically connected to the circuit layer.

In summary, in the key structure of an embodiment of the disclosure, the linkage rod can pass through the bottom plate to reduce the gap between the keycap and the bottom plate, and the linkage rod is ensured to maintain a sufficient movement stroke, which not only conforms to the development trend of thinner products but also contributes to improving the operation reliability. In the key structure of another embodiment of the disclosure, the gap between the keycap and the bottom plate is reduced enough to accommodate the linkage rod, and the linkage rod is ensured to maintain a sufficient movement stroke, which not only conforms to the development trend of thinner products but also contributes to improving the operation reliability.

In order to make the features and advantages of the disclosure comprehensible, embodiments accompanied with drawings are described in detail below.

DESCRIPTION OF THE EMBODIMENTS

Figure 1A:
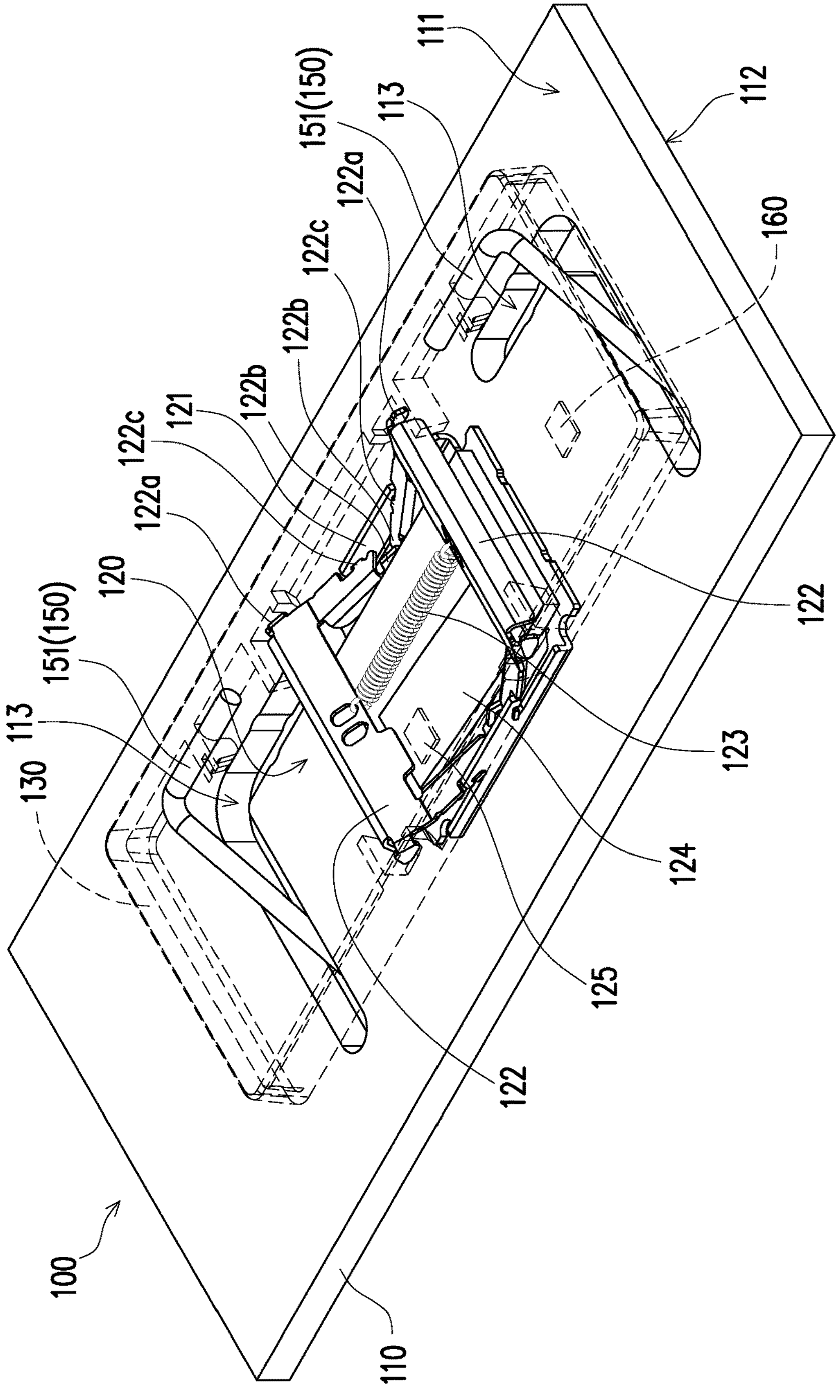
FIG. 1A is a schematic view of a key structure according to a first embodiment of the disclosure.

Reference will now be made in detail to the exemplary embodiments of the disclosure, examples of which are illustrated in the accompanying drawings. Whenever possible, the same reference numerals are used to represent the same or similar parts in the accompanying drawings and description.

Figure 1B:
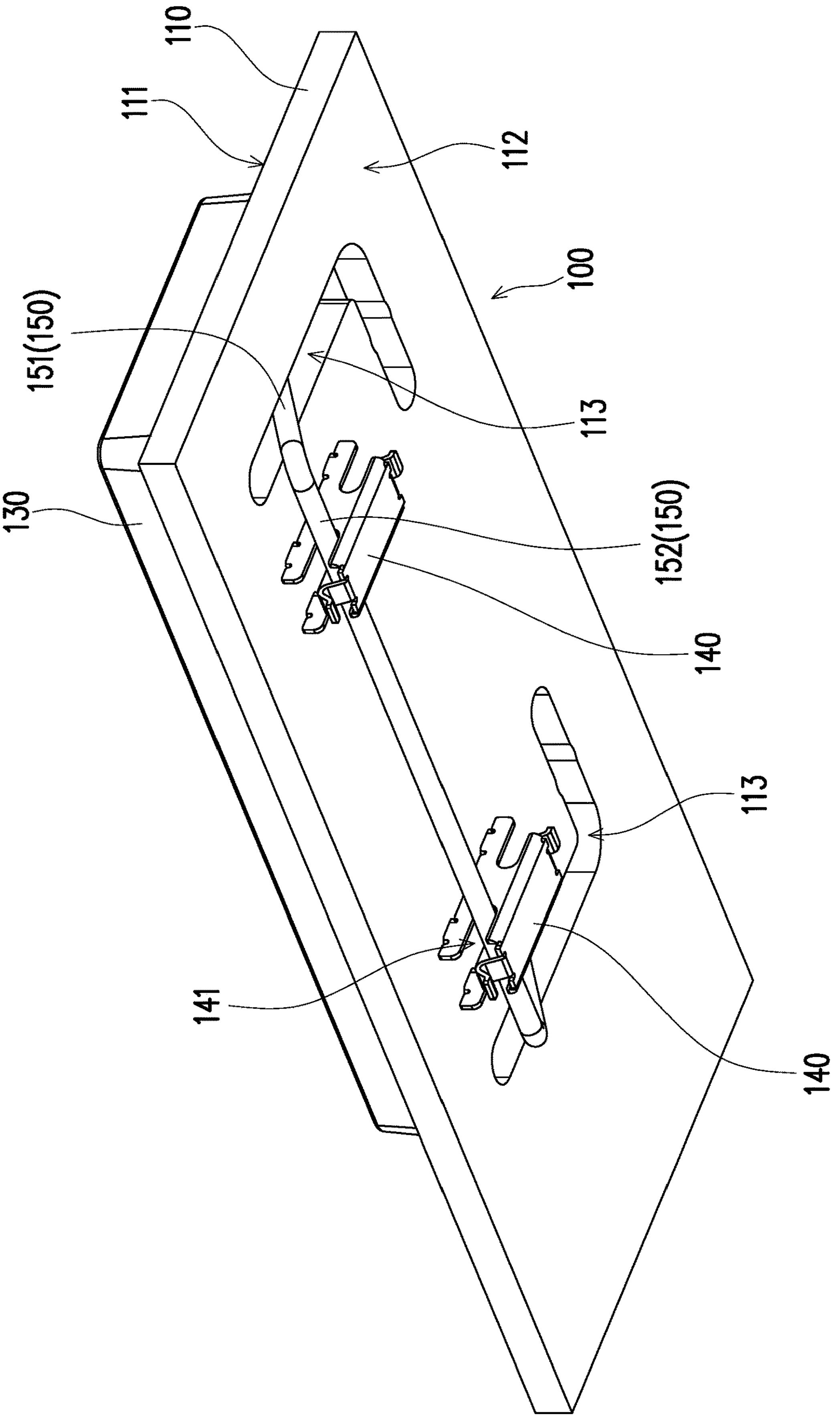
FIG. 1B is a schematic view of the key structure of FIG. 1A from another perspective.
Figure 1C:
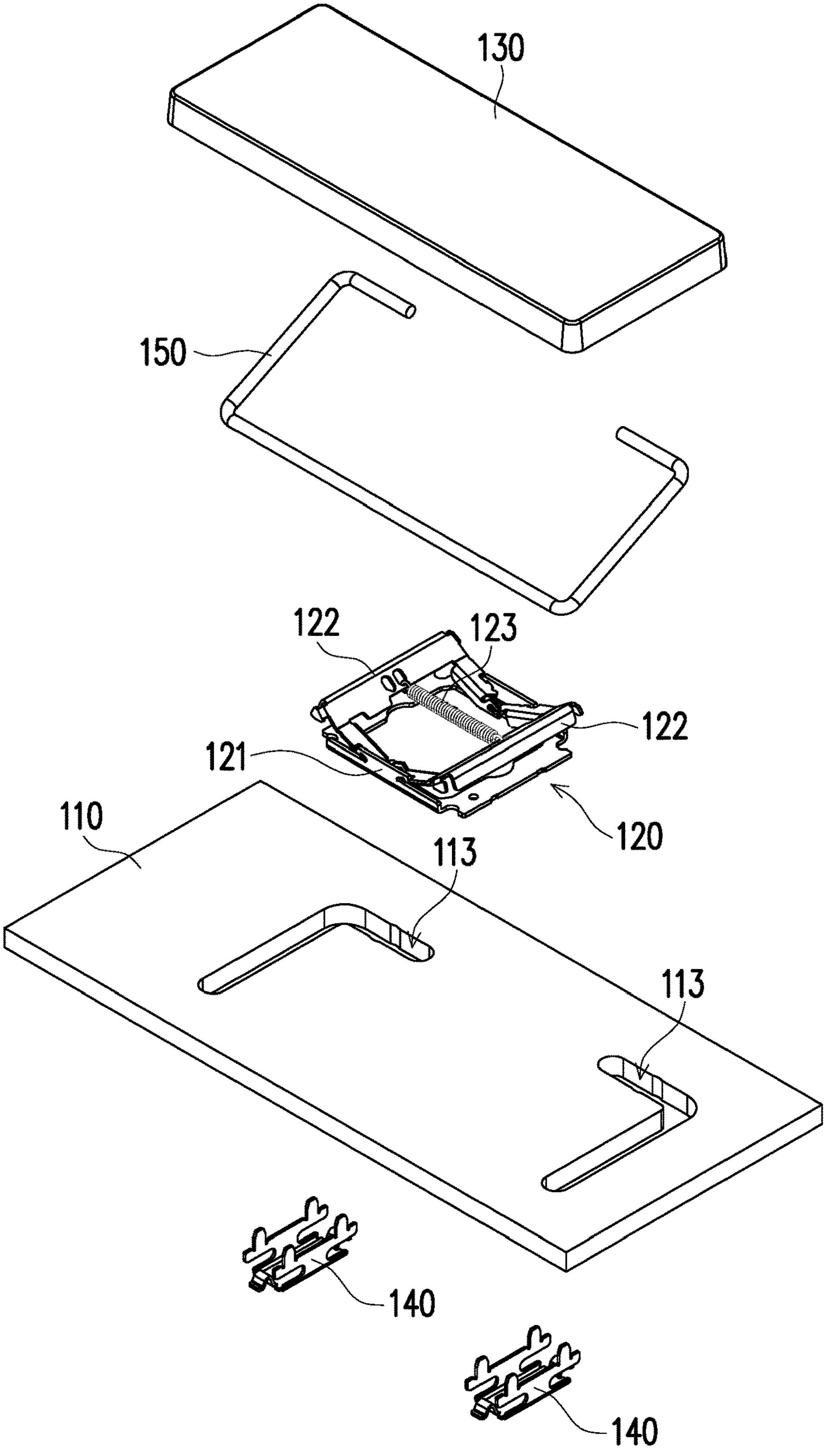
FIG. 1C is an exploded schematic view of the key structure of FIG. 1A.

FIG. 1A is a schematic view of a key structure according to a first embodiment of the disclosure. FIG. 1B is a schematic view of the key structure of FIG. 1A from another perspective. FIG. 1C is an exploded schematic view of the key structure of FIG. 1A. To clearly present the configuration relationship between various components, a keycap 130 in FIG. 1A is illustrated with dotted lines. Referring to FIG. 1A to FIG. 1C, in the embodiment, a key structure 100 may be a space bar or other long keys in a keyboard. In detail, the key structure 100 includes a bottom plate 110, a switch element 120, a keycap 130, a positioning element 140, and a linkage rod 150. In an embodiment, the bottom plate 110 includes a metal support plate and a circuit layer. The bottom plate 110 may be a combination of a metal support plate, a membrane circuit board and a printed circuit board (e.g., PCB or FPCB), and the switch element 120 is disposed between the keycap 130 and the bottom plate 110. For example, the bottom plate 110 may be a relatively rigid circuit board; the bottom plate 110 may also be a combination of a metal support plate and a printed circuit board stacked from top to bottom (e.g., in the direction from the keycap 130 to the bottom plate 110); the bottom plate 110 may also be a membrane circuit board and a metal support plate stacked from top to bottom; the bottom plate 110 may also be a combination of a membrane circuit board, a metal support plate, and a printed circuit board stacked from top to bottom.

The bottom plate 110 has a first surface 111 facing the keycap 130, a second surface 112 opposite to the first surface 111, and a groove 113 extends from the first surface 111 to the second surface 112. The switch element 120 is disposed on the first surface 111 and used to support the keycap 130. The positioning element 140 is connected to the second surface 112 and protrudes from the second surface 112. For example, the positioning element 140 is a metal material, which can be fixed to the bottom plate 110 by surface adhesive technology; the positioning element 140 may be a plastic material, which can be fixed to the bottom plate 110 by buried injection or engaging. On the other hand, the linkage rod 150 is disposed between the keycap 130 and the positioning element 140, one side of the linkage rod 150 is in contact with the keycap 130, and the other side of the linkage rod 150 is in contact with the positioning element 140. Furthermore, the linkage rod 150 extends from the keycap 130 to the positioning element 140 and passes through the bottom plate 110. The linkage rod 150 has a portion disposed at a position corresponding to the groove 113. The groove 113 that may penetrate the first surface 111 and the second surface 112 is configured corresponding to the linkage rod 150 and serves as a channel for the linkage rod 150 to pass through the bottom plate 110.

Subsequently, the linkage rod 150 may pass through the bottom plate 110, the gap between the keycap 130 and the bottom plate 110 is reduced, and the linkage rod 150 is ensured to maintain a sufficient movement stroke, which not only conforms to the development trend of thinner products but also contributes to improving the operation reliability.

Referring to FIG. 1A, in the embodiment, the switch element 120 may be a mechanical switch and includes a base 121, two brackets 122, an elastic restoring body 123, a trigger body 124, and a trigger contact 125. The base 121 is fixed on the bottom plate 110, and the two brackets 122 are in contact with the keycap 130. In the embodiment, the bottom plate 110 includes a metal support plate and a printed circuit board, the base 121 may be connected to the metal support plate, and the trigger contact 125 is disposed on the printed circuit board and correspondingly located at the opening of the metal support plate. The two brackets 122 are movably engaged with each other and generally have a V-shaped structure. The two brackets 122 are movably connected to the base 121 and used to support the keycap 130. In addition, two opposite ends of the elastic restoring body 123 are each connected to the two brackets 122, a spring. e.g., a tension spring, may be used, and two ends of the spring are each connected to the upper parts of the two brackets 122. When the keycap 130 is pressed down, the keycap 130 drives the two brackets 122 to sink, and the elastic restoring body 123 is stretched by the two brackets 122. Once the downward pressure applied to the keycap 130 is removed, the elastic force of the elastic restoring body 123 drives the two brackets 122 to be lifted up to drive the keycap 130 to be lifted back to the initial position.

The trigger body 124 is disposed between the two brackets 122 and the base 121, and the trigger contact 125 is disposed on the bottom plate 110 (e.g., the printed circuit board or the membrane circuit board) corresponding to the trigger body 124. For example, the trigger body 124 is in contact with one of the brackets 122 or is disposed on the lifting path of one of the brackets 122, and the trigger contact 125 is disposed on the movement path of the trigger body 124 or in the orthographic projection area of the trigger body 124 on the bottom plate 110. When the keycap 130 is pressed down, the two brackets 122 sink, and one of the brackets 122 drives the trigger body 124 to move toward the bottom plate 110, so that the trigger body 124 is in contact with the trigger contact 125 to conduct the circuit. In another embodiment, the trigger body may also be disposed on at least one bracket 122; when the keycap 130 is pressed down, the two brackets 122 sink and move toward the bottom plate 110, so that the trigger body of the bracket 122 is in contact with the trigger contact to conduct the circuit.

Referring to FIG. 1A, each bracket 122 has a first engaging portion 122*a*, a second engaging portion 122*b* opposite to the first engaging portion 122*a*, and a third engaging portion 122*c* disposed between the first engaging portion 122*a* and the second engaging portion 122*b*. The first engaging portion 122*a* of each bracket 122 is movably engaged with the keycap 130, and the third engaging portion 122*c* is movably engaged with the base 121 to prevent the two brackets 122 from being detached from the base 121 when sinking or being lifted. In addition, the two second engaging portions 122*b* of the two brackets 122 are movably engaged with each other to prevent the two brackets 122 from being detached from each other when sinking or being lifted.

Referring to FIG. 1A and FIG. 1B, in the embodiment, the linkage rod 150 includes a first rod portion 151 in contact with the keycap 130 and a second rod portion 152 in contact with the positioning element 140. The first rod portion 151 extends from the keycap 130 to the bottom plate 110 and passes through the groove 113 to be connected to the second rod portion 152. In addition, the positioning element 140 has a positioning groove 141 for the second rod portion 152 to be slidably engaged on the positioning element 140. That is, part of the second rod portion 152 is slidably disposed within the positioning groove 141.

Referring to FIG. 1A, the first rod portion 151 is an L-shaped rod portion, and the groove 113 is an L-shaped groove. When the keycap 130 is pressed down, the keycap 130 drives the first rod portion 151 to move toward the bottom plate 110, and the first rod portion 151 may move into the groove 113. That is, the groove 113 is disposed on the lifting path of the first rod portion 151 for accommodating the sunk first rod portion 151. In other embodiments, as long as the first rod portion can be provided with a sufficient movement stroke, the groove may be a linear groove or a groove with other geometrical contours to accommodate a whole or part of the sunk first rod portion.

Referring to FIG. 1A, through the positioning element 140, the positioning relationship of a sliding contact between the linkage rod 150 and the bottom plate 110 is maintained, so the space between the keycap 130 and the bottom plate 110 is released for accommodating other elements, such as a light-emitting element 160. The light-emitting element 160 may be a light-emitting diode. The light-emitting element 160 is disposed on the first surface 111 of the bottom plate 110 and electrically connected to a printed circuit board or a membrane circuit board of the bottom plate 110. In the embodiment, the light-emitting element 160 is disposed in the projection area of the keycap 130 projected onto the bottom plate 110, and the light-emitting element 160 is located on one side of the switch element 120. Light emitted by the light-emitting element 160 may be correspondingly emitted to the light-transmitting area of the keycap 130. In another embodiment, the light-emitting element 160 may also be disposed at a respective center corresponding to keycap 130, such as in the projection area of the switch element 120 projected onto the bottom plate 110, so that the light emitted by the light-emitting element 160 may have a uniform light effect.

Figure 2A:
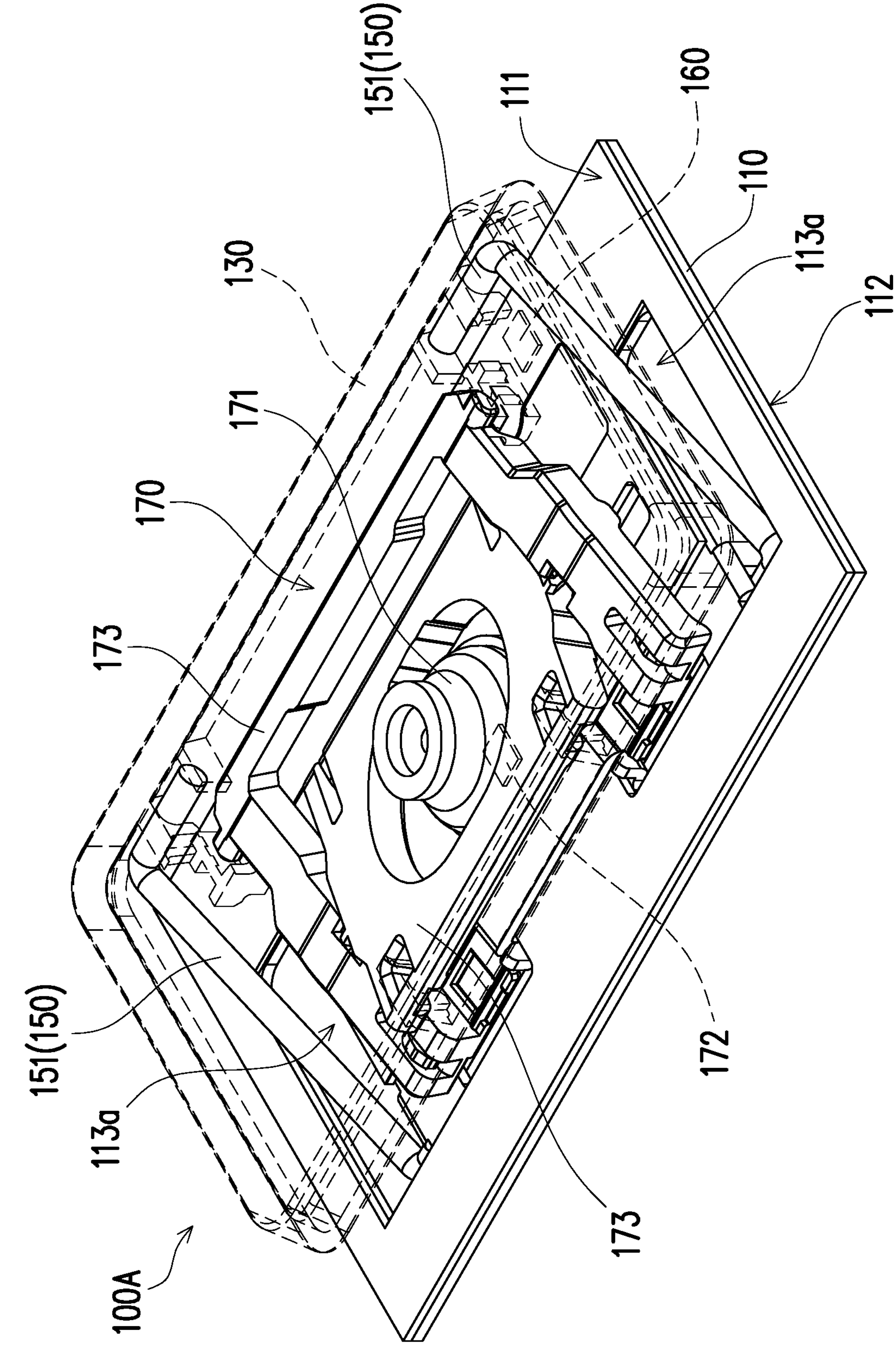
FIG. 2A is a schematic view of a key structure according to a second embodiment of the disclosure.
Figure 2B:
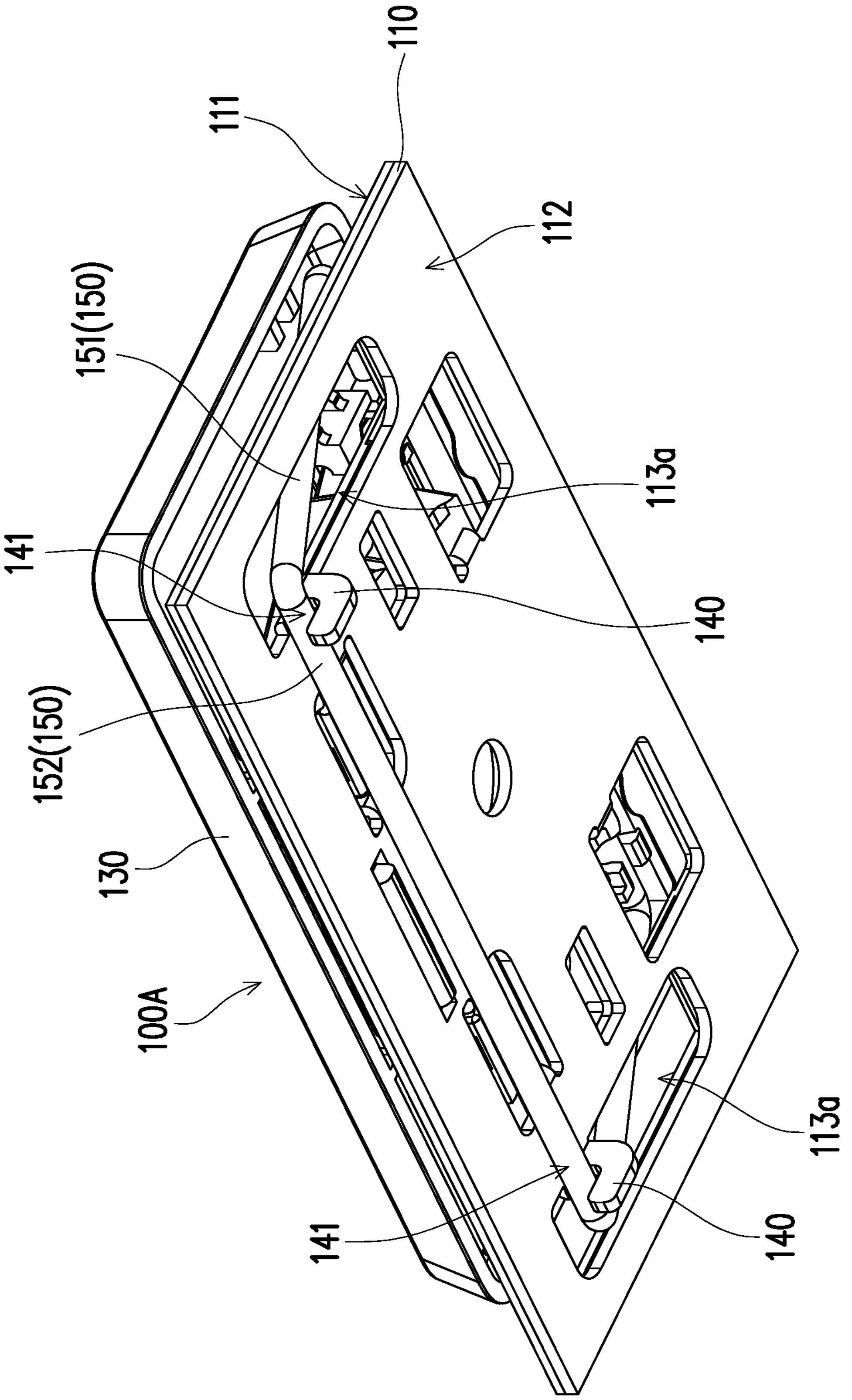
FIG. 2B is a schematic view of the key structure of FIG. 2A from another perspective.

FIG. 2A is a schematic view of a key structure according to a second embodiment of the disclosure. FIG. 2B is a schematic view of the key structure of FIG. 2A from another perspective. To clearly present the configuration relationship between various elements, the keycap 130 in FIG. 2A is illustrated with dotted lines. Referring to FIG. 2A and FIG. 2B, a switch element 170 of the embodiment is different from the switch element 120 of the first embodiment. In detail, the switch element 170 includes an elastic restoring body 171, a trigger contact 172 covered by the elastic restoring body 171, and two brackets 173 located on the periphery of the elastic restoring body 171. Two opposite ends of the elastic restoring body 171 are each in contact with the keycap 130 and the bottom plate 110 and may be a rubber dome or a silicone dome. The elastic restoring body 171 further includes a trigger body for triggering the trigger contact 172 to conduct the circuit when the keycap 130 is pressed down and provide the elastic force required when the keycap 130 is lifted.

On the other hand, the two brackets 173 are rotatably pivoted to each other to form a scissor structure. In detail, one end of each bracket 173 is in contact with the keycap 130 and the other end is in contact with the bottom plate 110. When the keycap 130 is pressed down, the two brackets 173 and the linkage rod 150 may drive the keycap 130 to sink smoothly, preventing the keycap 130 from tilting or shaking. In the embodiment, a groove 113*a* may be a linear groove and is disposed on the lifting path of the first rod portion 151 for accommodating part of the sunk first rod portion 151. As shown in FIG. 2B, the positioning element 140 protruding from the second surface 112 is, for example, integrally connected to the bottom plate 110. In the embodiment, the bottom plate 110 includes a printed circuit board and a metal support plate, and the positioning element 140 may be formed by integrally punching and bending the metal support plate material to the second surface 112.

Figure 3:
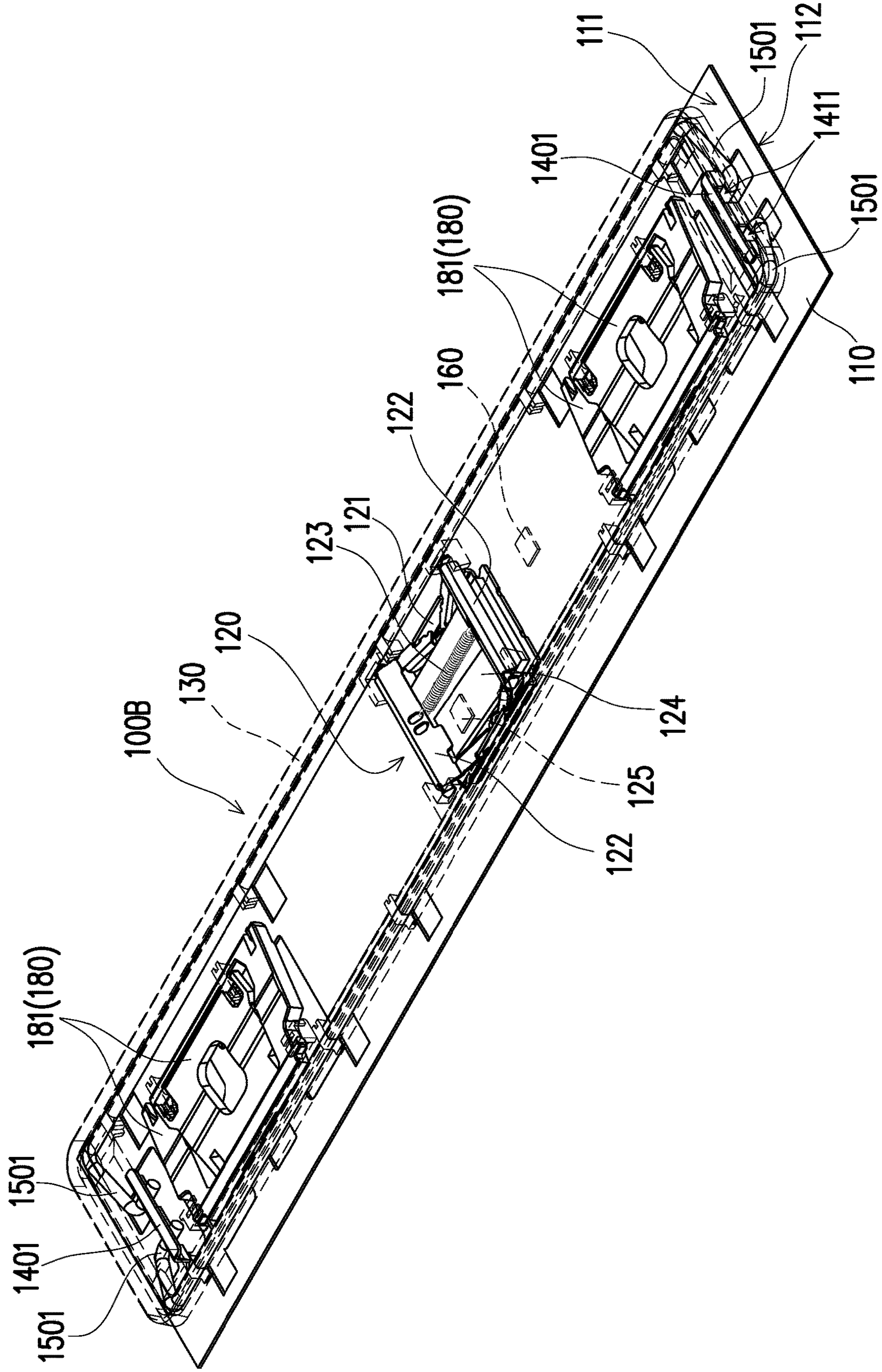
FIG. 3 is a schematic view of a key structure according to a third embodiment of the disclosure.

FIG. 3 is a schematic view of a key structure according to a third embodiment of the disclosure. To clearly present the configuration relationship between various elements, the keycap 130 in FIG. 3 is illustrated with dotted lines. Referring to FIG. 3, different from the key structure 100 of the first embodiment, a key structure 100B of the embodiment further includes a reciprocating element 180 disposed on the first surface 111 of the bottom plate 110. The reciprocating element 180 is located between the keycap 130 and the bottom plate 110 and may be a scissor structure composed of two brackets 181 rotatably pivoted to each other to support the keycap 130 together with the two brackets 122 of the switch element 120. For example, the two reciprocating elements 180 are each disposed on opposite sides of the switch element 120 to improve the operation stability of the key structure 100B.

On the other hand, the gap between the keycap 130 and the bottom plate 110 is reduced enough to accommodate a linkage rod 1501, and the linkage rod 1501 is ensured to maintain a sufficient movement stroke. Therefore, the positioning element 1401 may be connected to the first surface 111 of the bottom plate 110 and protrude from the first surface 111, so that one end of the linkage rod 1501 may be slidably disposed in a positioning groove 1411 of the positioning element 1401. That is, the linkage rod 1501 does not pass through the second surface 112 of the bottom plate 110 and is disposed between the keycap 130 and the bottom plate 110. In the embodiment, the bottom plate 110 includes a membrane circuit board, a metal support plate, and a printed circuit board. The positioning element 1401 is connected to the metal support plate and extends upward through the membrane circuit board toward the keycap 130 and is disposed outside the base 121. The trigger contact 125 and the light-emitting element 160 are disposed on the printed circuit board and correspond to the opening of the metal support plate. As shown in FIG. 3, the light-emitting element 160 is disposed between the switch element 120 and the reciprocating element 180. In another embodiment, the light-emitting element 160 may also be disposed at a respective center corresponding to the keycap 130, that is, in the projection area of the switch element 120 projected onto the bottom plate 110.

Note that the positioning element 141 of the key structure 100 of the first embodiment and the positioning element 141 of a key structure 100A of the second embodiment can also adopt the configuration of the positioning element 1401 of the third embodiment, so that the linkage rod 150 can be disposed between the keycap 130 and the bottom plate 110.

In summary, in the key structure of an embodiment of the disclosure, the linkage rod can pass through the bottom plate to reduce the gap between the keycap and the bottom plate, and the linkage rod is ensured to maintain a sufficient movement stroke, which not only conforms to the development trend of thinner products but also contributes to improving the operation reliability. In the key structure of another embodiment of the disclosure, the gap between the keycap and the bottom plate is reduced enough to accommodate the linkage rod, and the linkage rod is ensured to maintain a sufficient movement stroke, which not only conforms to the development trend of thinner products but also contributes to improving the operation reliability.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A key structure, comprising:

a bottom plate comprising a first surface, a second surface opposite to the first surface, and a groove extending from the first surface to the second surface;

a switch element disposed on the first surface;

a keycap disposed on the switch element, wherein the switch element is located between the bottom plate and the keycap;

a positioning element connected to the second surface, wherein a portion of the positioning element protrudes from the second surface of the bottom plate and is located outside the groove; and a linkage rod disposed between the keycap and the positioning element, wherein the linkage rod has a portion disposed at a position corresponding to the groove, and two opposite sides of the linkage rod are each in contact with the keycap and the positioning element, wherein the switch element and the linkage rod are two separate components, wherein the linkage rod has a first rod portion connecting to the keycap and partially covering the groove and a second rod portion engaged to the positioning element protruding from the second surface of the bottom plate.

2. The key structure according to claim 1, wherein the switch element comprises a base, two brackets, and an elastic restoring body; the base is engaged with the first surface of the bottom plate and located between the keycap and the bottom plate; the two brackets are in contact with the keycap and are movably connected to the base; and two opposite ends of the elastic restoring body are respectively connected to the two brackets.

3. The key structure according to claim 2, wherein each of the brackets comprises a first engaging portion, a second engaging portion opposite to the first engaging portion, and a third engaging portion between the first engaging portion and the second engaging portion, wherein the first engaging portion of each of the brackets is movably engaged with the keycap, the third engaging portion of each of the brackets is movably engaged with the base, and the two second engaging portions of the two brackets are movably engaged with each other.

4. The key structure according to claim 2, wherein the switch element further comprises a trigger body and a trigger contact, the trigger body is disposed between the two brackets and the base, and the trigger contact is disposed on the bottom plate corresponding to the trigger body.

5. The key structure according to claim 2, wherein the elastic restoring body is a spring, and two ends of the spring are each connected to upper parts of the two brackets.

6. The key structure according to claim 2, further comprising a reciprocating element disposed on the first surface, wherein the reciprocating element is located between the keycap and the bottom plate and on one side of the switch element.

7. The key structure according to claim 1, wherein the positioning element comprises a positioning groove, and one end of the linkage rod is slidably disposed in the positioning groove.

8. The key structure according to claim 1, wherein the groove is located at a position corresponding to a lifting path of the first rod portion.

9. The key structure according to claim 1, wherein the switch element comprises an elastic restoring body, a trigger contact covered by the elastic restoring body, and two brackets located outside the elastic restoring body, wherein two opposite ends of the elastic restoring body are each in contact with the keycap and the bottom plate, one end of the bracket is in contact with the keycap, and the other end of the brackets is in contact with the bottom plate.

10. The key structure according to claim 1, further comprising a light-emitting element disposed on the first surface of the bottom plate, wherein the light-emitting element is disposed in a projection area of the keycap projected onto the bottom plate.

11. A key structure, comprising:

a bottom plate;

a keycap disposed on the bottom plate;

a switch element located between the bottom plate and the keycap and comprising a base, two brackets, and an elastic restoring body, wherein the base is engaged with a surface of the bottom plate facing the keycap and located between the keycap and the bottom plate, the two brackets are in contact with the keycap and are movably connected to the base, and two opposite ends of the elastic restoring body are respectively connected to the two brackets, wherein each of the brackets comprises a first engaging portion, a second engaging portion opposite to the first engaging portion, and a third engaging portion between the first engaging portion and the second engaging portion, the first engaging portion of each of the brackets is movably engaged with the keycap, the third engaging portion of each of the brackets is movably engaged with the base, and the two second engaging portions of the two brackets are movably engaged with each other;

a positioning element connected to the bottom plate;

a linkage rod disposed between the bottom plate and the keycap, wherein two opposite sides of the linkage rod are each in contact with the keycap and the positioning element, wherein the switch element and the linkage rod are two separate components, wherein the linkage rod has a rod portion connected to the keycap and partially covering an opening passing through the bottom plate; and a light-emitting element disposed on the bottom plate, wherein the light-emitting element is located on one side of the switch element or in a projection area of the switch element projected onto the bottom plate.

12. The key structure according to claim 11, wherein the switch element further comprises a trigger body and a trigger contact, the trigger body is disposed between the two brackets and the base, and the trigger contact is disposed on the bottom plate corresponding to the trigger body.

13. The key structure according to claim 11, wherein the elastic restoring body is a spring, and two ends of the spring are each connected to upper parts of the two brackets.

14. The key structure according to claim 11, further comprising a reciprocating element disposed on the bottom plate, wherein the reciprocating element is located between the keycap and the bottom plate and on one side of the switch element.

15. The key structure according to claim 11, wherein the positioning element extends toward the keycap and is located outside the base.

16. The key structure according to claim 11, wherein the positioning element comprises a positioning groove, and one end of the linkage rod is slidably disposed in the positioning groove.

17. The key structure according to claim 11, wherein the bottom plate comprises a metal support plate and a circuit layer, and the light-emitting element is electrically connected to the circuit layer.

18. The key structure according to claim 11, wherein the switch element comprises an elastic restoring body, a trigger contact covered by the elastic restoring body, and two brackets located at a position corresponding to a periphery of the elastic restoring body, wherein two opposite ends of the elastic restoring body are each in contact with the keycap and the bottom plate, one end of the bracket is in contact with the keycap, and the other end of the bracket is in contact with the bottom plate.

* * * * *